Oct. 4, 1966  F. A. CLARK  3,276,501
ANTI-SKID TIRES
Filed Dec. 4, 1964

INVENTOR
FRANCIS A. CLARK

BY *Fisher, Christen, Sabol & Caldwell*
ATTORNEYS

United States Patent Office 3,276,501
Patented Oct. 4, 1966

3,276,501
ANTI-SKID TIRES
Francis A. Clark, 205 Bradford St.,
Charleston, W. Va. 25301
Filed Dec. 4, 1964, Ser. No. 416,165
11 Claims. (Cl. 152—211)

This invention relates to pneumatic tires and, more particularly, to automotive tires which are characterized by greatly improved skid resistance. Still more particularly, the invention relates to anti-skid pneumatic tires which are especially effective on slick wet pavement and are also effective in avoiding skids on snow and ice and further characterized as containing abrasive granules, such as cinder or sand granules.

Heretofore anti-skid pneumatic tires have been manufactured to incorporate a wide variety of skid resistant materials, including wood chips, walnut shell chips, tungsten carbide pellets, salt, sand and various other abrasive or skid resisting materials. Such anti-skid tires met with varying degrees of success but for the most part were either too expensive to manufacture or were ineffective in retaining the skid resistant granules in the pneumatic tires within which they were imbedded. Consequently, while a prior art tire of the type described above may provide skid resisting qualities, such qualities in many cases were short-lived. In addition, prior art anti-skid tires were subject to considerable wear and in most cases wore out within ten to twelve thousand miles of use.

Figure 1:
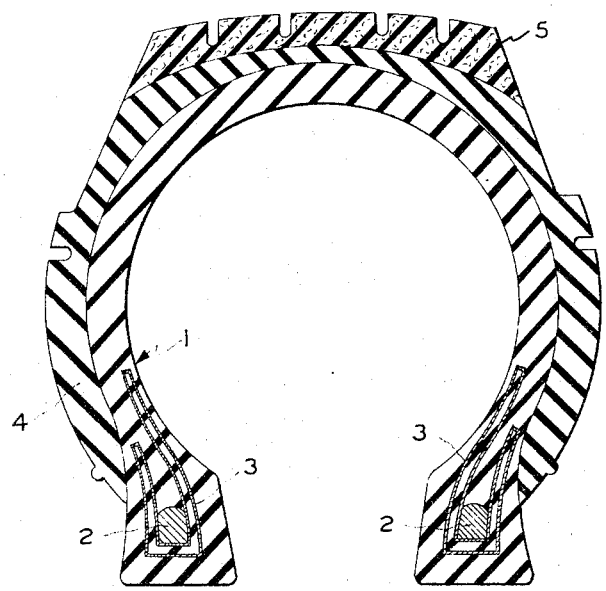
FIG. 1 is a cross-section of a pneumatic tire incorporating the invention described herein.
Figure 2:
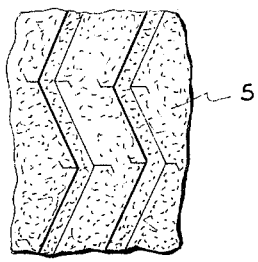
FIG. 2 is a fragmentary plan view showing the tread surface of the pneumatic tire shown in FIG. 1.

Primarily the object of this invention therefore is the provision of anti-skid tires which are long-lived and which retain the abrasive particles employed to impart skid resistance thereto over long periods of time, even though such particles have been exposed to the tread surface of the tire because of wear.

Another object is the provision of a means for easily and quickly imparting a skid resistant surface to automotive tires whether or not such tires are new, partly worn or fully worn and whether or not such tires are mounted for use on an automotive vehicle.

A further object is the provision of recapping materials, such as camel-back having anti-skid properties, for use in recapping or retreading used worn pneumatic tires.

Another object is the provision of anti-skid tire coatings and/or camel-back of the type mentioned above which are resistant to water and wear and which are characterized by durable skid resistance.

Other objects and advantages will be apparent from the following detailed description of one embodiment of this invention.

According to the present invention, a mixture of dried glue, pitch and dried sand is prepared for application to automotive tires. This mixture can be mixed directly into the tread portion of the tire during manufacture of same or it can be applied to the tire after manufacture and even after use. It has been unexpectedly found that such mixtures of glue, pitch and sand are capable of providing durable skid resistance to automotive tires and in particular are capable of retaining the abrasive sand particles in attachment to the tire, even under extremely severe conditions of use.

It is well known that glues, such as animal glues, have a tensile strength and shear stress component which is usually in excess of ordinary industrial requirements. However, glues are generally soluble in water; when used on the surface of tires, the glue may well dissolve on wet roads and allow the sand to fall away from the tire surface.

Roofing pitches are available which are water resistant; however, the pitch does not have the superior tensile strength and shear resistance of glue. The roofing pitches are generally more flexible than glues, and contain a considerable quantity of resinous materials incorporated within them.

By combining quantities of animal glues with roofing pitch, there is obtained a composition which has the strong tensile strength and shear resistance properties of glue, together with the water resistance and flexibility of roofing pitch. When these two substances are mixed together under the proper conditions, they provide a strong bonding agent between the sand granules and the rubber of the tire tread.

It is to be understood that granules of cinders can be employed in similar amounts as sand granules.

A particularly advantageous aspect of this invention is the provision of compositions comprising sand, pitch and dried glue which can be applied to the surface of pneumatic tires whether in new condition or used condition so as to impart skid resistance thereto. The mode of applying such compositions is not narrowly critical and they can be simply brushed onto the tire or applied with a spatula, putty knife or any suitable means. It is not necessary to avoid the accumulation of the composition within the tread channels and, in fact, it is preferable to fill the same since the composition when cooled and solidified provides improved skid resistance over and above the skid resisting properties of the tread channels or the tire rubber itself. The novel composition is normally solid at room temperatures and must be heated to an elevated temperature, e.g., 58° to 100° C., in order to liquefy it for application to the tread portion of the tire. When liquefied the composition has the appearance of a black creamy emulsion which is readily spread by a brush or spatula. After application of the composition to the tread portion and before solidifying of such composition, sand or other abrasive granules can be sprinkled on the surface of the composition and pressed into said composition in order to further increase the skid resisting properties thereof is desired and to provide instant traction as soon as the tire is put into use.

These compositions are especially adapted for packaging, use and sale in the do-it-yourself market. In this regard the compositions can be prepared and packaged in suitable plastic containers, such as polyethylene, polypropylene and Saran film bags, and the like, which are resistant to pitch or in metal cans. The bags or cans are then sealed in the known manner, attached to suitable mounting or display cards and sold over the counter to the consuming public. When it is desired to use the composition, the bag or can is heated in boiling water until liquid. The bag or can is opened and the contents are poured or squeezed onto the surface of the tire tread portion and spread with a suitable instrument. Such bags or cans are useful in service station or tire shop applications because of the obvious ease of application characteristic of such packaged products.

The compositions of this invention which contain sand, glue and pitch can also be incorporated within the tire tread portion either during the initial manufacture of the tire or in subsequent recapping thereof.

Such compositions can contain from 20 to 30 weight percent of pitch, 20 to 30 weight percent of dried glue and 40 to 60 weight percent of sand. A particularly useful composition was made from 25 weight percent of ordinary roofing pitch Code No. 9,750,101 made and sold by Reilly Tar and Chemical Corporation, 25 weight percent of dried ground animal glue, Peter Cooper Standard Grade 1XM, National Association of Glue Manufacturers Grade No. 10, bloom gram range of 237–266, bloom gram midpoint 251 and minimum millipoise value of 92 made by Peter Cooper Corporation, and 50 weight percent of glassmaker's sand, e.g., dried quarry sand. All of the above materials are of low water content since it is necessary to avoid the presence of water so as to increase the bonding effect of the sand or other abrasive granules to the tire rubber. Other ingredients for providing any special effect desired can be added to the compositions. It is preferable that the pitch be heated in order to liquefy the same. Heat within the range of from 50° to 100° C., depending upon the softening point of the pitch, is appropriate. Once the pitch has been liquefied the glue, preferably in granular form, is added and stirred to produce a homogeneous creamy black emulsion having a thin consistency. At this point the sand is stirred into the mixture of glue and pitch and all three are stirred until a homogeneous mixture is obtained. The final mixture of sand, glue and pitch can be employed as is or can be packaged while in liquid form, permitted to solidify, and then stored or sold.

Any suitable grade of pitch can be employed in the compositions of this invention. Such materials are commonly available on the market and it has been found that water resistant roofing pitch when employed in the present invention provides excellent results. Similarly, any desirable type of glue can be employed and especially useful glues are the animal glues, such as those made and sold by the Peter Cooper Corporation, and as described in a pamphlet entitled, "Animal Glues," by John R. Hubbard, of Peter Cooper Corporation, and printed by special permission of Reinhold Publishing Corporation from the "Handbook of Adhesives," by Irving Skeist.

The sand granules or particles employed in the present invention are characterized by angular rough surfaces, such as found in quarry sand or glassmaker's sand. The particle size of the sand granules is not narrowly critical and can range from ⅛ to 1/64 of an inch in diameter. Cinders of like particle size can be employed in place of part or all of the sand with substantially equivalent superior results in skid inhibition.

It is furthermore preferable to dry the sand or cinder particles, such as by heating, or by the use of solvents, such as acetone and the like, or otherwise. It has been found that heating of the sand to temperatures of at least 212° F. for adequate periods of time to drive off substantially all of the water present on the sand or cinders provides outstandingly high skid inhibition and bonding of the granules in or to the rubber of the tire.

It has been found that the above compositions can also be incorporated into the rubber of the tire tread as well as coated on the surface thereof. This can be done when the tire is initially formed or can be done on recapping material which is later applied to the tire after it has worn down. In this respect the composition can be added to the rubber matrix prior to the formation of the tread portion or recapping material, such as camel-back, so as to provide the homogeneous mixture of said composition and rubber matrix. A Banbury mixer has been employed with notable success to perform the above-mentioned mixing. Any rubber matrix presently employed in the manufacturing of automotive tires including tires for automobiles, trucks, tractors, buses and the like, as well as tires utilized on the landing apparatus of aircraft, can be used. Such rubber includes synthetic rubber, natural rubber, mixtures of the two, or plastic or any mixture thereof. It has been found that optimum results are obtained when 15 to 30 weight percent of the above-mentioned composition and 70 to 85 weight percent of the vulcanized rubber matrix are employed in manufacturing the tire or camel-back in accordance with this invention; the tread surface may or may not have a tread design as desired. Tires or camelback having a smooth tread surface without any indentations or configurations or design are of particular importance in that they provide a larger frictional contact between the rubber surface containing the abrasive particles, such as sand or cinder, and the road surface, thus providing a greater degree of traction with the road surface. However, if desired, the tire or camel-back made according to this invention can be provided with a tread design which imparts the well-known wiping action to the road surface in addition to the improved traction provided by the abrasive particles bonded within the tread portion.

A specific example of a tire made according to this invention includes the specific composition described above mixed in the amount of approximately 30 weight percent with a conventional rubber matrix in the amount of approximately 70 weight percent. The matrix and composition are milled through a Banbury mixer until a homogeneous mixture results. A tire body, as shown in FIG. 1, is made in the usual manner from bead elements 2, strengthening cords 3, side wall portions 4 and sub-tread portions utilizing a conventional rubber matrix. A tread portion 5 is then formed on a tire utilizing the above described mixture of conventional rubber matrix and the specific novel composition. The tire thus formed contains the anti-skid abrasive materials in the tread portion only and thus avoids any wear or abrasion on the critical portions of the tire itself, such as the side walls and sub-tread portions thereof.

If desired, a part or all of the carbon black normally used in the rubber matrix for the tread portion to which the novel compositions of this invention are added can be replaced by the above-mentioned composition, for example, the usual tire contains from 10 to 20 pounds of carbon black per 100 pounds of matrix. Some or all of this carbon black can be left out of the tread strip material and replaced by the above-mentioned composition. However, it is believed to be desirable to permit a certain amount of such carbon black to remain so as to provide the customary black color to the tire.

Tread portions of tires and camel-back can be made from sand, glue and the usual rubber matrix. In this respect, 5 to 15 weight percent of sand of the type described above, 5 to 15 weight percent of glue of the type described above are mixed with 70 to 90 percent of conventional rubber. A specific composition of 7.5 weight percent sand, 7.5 weight percent glue and 85 weight percent of a conventional rubber matrix was prepared and formed a tread portion of a pneumatic tire. In this regard the glue is preferably liquefied by heating same or by another suitable means and the sand is mixed therewith so as to provide a homogeneous mixture. Such mixture can be permitted to solidify upon cooling and then reground or can be added in liquid form to the rubber matrix and milled through a chamber mixer so as to provide a homogeneous mixture of the sand coated with glue in the rubber matrix. The tire or camel-back is then made with this composition as the tread portion thereof in the usual manner as described above. Such compositions containing sand, glue and rubber matrix without the pitch have superior skid resisting properties over heretofore known anti-skid tires but are not quite as water resistant as tires or camelback made with compositions containing pitch in addition to sand and glue.

The compositions of this invention containing sand, pitch and glue provide an improved bonding of the sand on or in the tire tread portion, such bonding is substantially completely water-proof due to the pitch and discourages the fallout of the abrasive sand or cinder granules. All compositions of this invention described above improve the bonding of the sand within the tire tread portion or camel-back and discourage the fallout of the sand or cinder particles incoporated therein. In addition, the tensile strength of the tread portion or camel-back is greatly increased and the overall skid resistance of the tire to which the tread portion or camel-back or novel composition is applied is greatly improved. In addition, the wear resistance of the tire is considerably extended.

Although the invention has been described in detail above, there are many variations and combinations that will occur to skilled workers whereby the disclosed invention can be utilized in many different forms and embodiments. In spite of the above detailed description, the present invention is not to be limited to details as set forth above but is defined and only limited by the claims appended hereto.

What is claimed is:

1. A novel composition for application to the tread surface of rubber tires to form an adherent coating thereon for providing skid resistance thereto consisting essentially of 20 to 30 weight percent of dried glue, 20 to 30 weight percent of pitch and 40 to 60 weight percent of dried sand, said composition being contained in a sealed package.

2. Composition as claimed in claim 1 wherein said sand was pre-dried to drive off substantially all water present thereon.

3. The method of imparting skid resistance to automotive tires comprising applying to said tire a coating comprising 20 to 30 weight percent of pitch, 20 to 30 weight percent of dried glue and 40 to 60 weight percent of sand, and permitting said coating to dry.

4. Method as claimed in claim 3 wherein said sand was pre-dried to drive off substantially all water present thereon.

5. The method of imparting skid resistance to tires comprising forming on the tread surface of said tire an adherent coating comprising 25 weight percent of pitch, 25 weight percent of dried glue and 50 weight percent of sand.

6. Tread strips for recapping automotive tires to render said tire skid resistant, said strips comprising sand granules coated with a mixture of pitch and dried glue, bonded into a homogeneous mass with a vulcanized rubber matrix, said sand being present in an amount of 5 to 15 weight percent, said pitch being present in the amount of 2½ to 7½ weight percent and said glue being present in the amount of 2½ to 7½ weight percent, said percentages being based upon the weight of said tread strip.

7. Tread strips for recapping automotive tires to render said tire skid resistant, said tread strips comprising sand granules coated with dried glue bonded into a homogeneous mass by a vulcanized rubber matrix, said sand being present in the amount of 5 to 15 weight percent, said glue being present in the amount of 5 to 15 weight percent, said percentages being based upon the weight of said tread strip.

8. A tire having a tread portion comprising sand granules coated with a mixture of dried glue and pitch bonded into a homogeneous mass by a vulcanized rubber matrix, wherein said sand is present in the amount of 5 to 15 weight percent of said tread portion, said dried glue is present in the amount of 2.5 to 7.5 weight percent of said tread portion and said pitch is present in the amount of 2.5 to 7.5 weight percent of said tread portion.

9. Tire as claimed in claim 8 wherein said sand was pre-dried to drive off substantially all water present thereon.

10. The automotive tire having a skid-resistant tread portion comprising sand granules coated with dried glue, wherein said sand is present in the amount of 5 to 15 weight percent of said tread portion and said dried glue is present in the amount of 5 to 15 weight percent of said tread portion.

11. A tire as claimed in claim 10 wherein said sand is present in an amount of 10 weight percent of said tread portion and said dried glue is present in the amount of 10 weight percent of said tread portion.

References Cited by the Examiner

UNITED STATES PATENTS

| 674,823 | 5/1901 | Ames | 106—134 |
| 1,106,985 | 8/1914 | Stritzel | 152—211 |
| 1,824,815 | 9/1931 | Fuchs | 152—211 |
| 3,062,255 | 11/1962 | Clark et al. | 152—211 |

FOREIGN PATENTS 23,412     1905     Great Britain.

ARTHUR L. LA POINT, *Primary Examiner.*

C. W. HAEFELE, *Assistant Examiner.*